(12) United States Patent
Jin et al.

(10) Patent No.: US 11,739,675 B2
(45) Date of Patent: Aug. 29, 2023

(54) EXHAUST GAS AFTER-TREATMENT SYSTEM

(71) Applicant: Hyundai Doosan Infracore Co., Ltd., Incheon (KR)

(72) Inventors: Dongyoung Jin, Incheon (KR); Inhyuk Im, Incheon (KR); Jiseok Kim, Incheon (KR); Rin Hyun, Incheon (KR); Taejoong Wang, Incheon (KR)

(73) Assignee: HYUNDAI DOOSAN INFRACORE CO., LTD., Incheon (KR)

( * ) Notice: Subject to any disclaimer, the term of this patent is extended or adjusted under 35 U.S.C. 154(b) by 0 days.

(21) Appl. No.: 17/671,730

(22) Filed: Feb. 15, 2022

(65) Prior Publication Data

US 2022/0259995 A1    Aug. 18, 2022

(30) Foreign Application Priority Data

Feb. 15, 2021 (KR) .................. 10-2021-0020169

(51) Int. Cl.
*F01N 3/10* (2006.01)
*F01N 3/20* (2006.01)
(Continued)

(52) U.S. Cl.
CPC .......... *F01N 3/208* (2013.01); *B01D 53/944* (2013.01); *B01D 53/9418* (2013.01);
(Continued)

(58) Field of Classification Search
CPC .......... B01D 53/9418; B01D 53/9436; B01D 53/944; B01D 53/9495; B01J 19/0013;
(Continued)

(56) References Cited

U.S. PATENT DOCUMENTS 9,976,462 B2 * 5/2018 Lutz .................... B01J 23/72
10,690,033 B1    6/2020 Johnson et al.
(Continued)

FOREIGN PATENT DOCUMENTS

CN    101784767 A    7/2010
CN    102906385 A    1/2013
(Continued)

OTHER PUBLICATIONS

The extended European Search Report dated Jun. 29, 2022 for corresponding European Patent Application No. 22156241.6.
(Continued)

*Primary Examiner* — Audrey B. Walter
*Assistant Examiner* — Dapinder Singh
(74) *Attorney, Agent, or Firm* — Hauptman Ham, LLP (57) ABSTRACT

An exhaust gas after-treatment system includes a first reactor installed in an exhaust flow path, a second reactor disposed at a downstream side from the first reactor, a first reducing agent injection unit and a second reducing agent injection unit configured to respectively inject a reducing agent toward the exhaust gas to be introduced into the first reactor and the second reactor, a first temperature sensor and a second temperature sensor configured to respectively measure a temperature of the exhaust gas to be introduced into the first reactor and the second reactor, and a control device configured to control whether to inject the reducing agent from the first and second reducing agent injection units and the amount of reducing agent to be injected on the basis of temperature information provided by the first and second temperature sensors.

9 Claims, 3 Drawing Sheets

(51) Int. Cl.
*F01N 13/00* (2010.01)
*B01D 53/94* (2006.01)
*B01J 19/00* (2006.01)
*F02D 41/02* (2006.01)
*B01J 19/24* (2006.01)
*F01N 3/035* (2006.01)

(52) U.S. Cl.
CPC ..... *B01D 53/9436* (2013.01); *B01D 53/9495* (2013.01); *B01J 19/0013* (2013.01); *B01J 19/0033* (2013.01); *B01J 19/245* (2013.01); *F01N 3/035* (2013.01); *F01N 3/106* (2013.01); *F01N 13/0093* (2014.06); *F02D 41/0245* (2013.01); *B01J 2219/00162* (2013.01); *B01J 2219/00182* (2013.01); *F01N 2610/1406* (2013.01); *F01N 2610/1433* (2013.01); *F01N 2610/1453* (2013.01); *F01N 2900/1402* (2013.01); *F01N 2900/1404* (2013.01)

(58) Field of Classification Search
CPC ................. B01J 19/0033; B01J 19/245; B01J 2219/00162; B01J 2219/00182; F01N 3/035; F01N 3/106; F01N 3/208; F01N 3/2066; F01N 3/206; F01N 13/0093; F01N 13/009; F01N 2610/1406; F01N 2610/1433; F01N 2610/1453; F01N 2610/02; F01N 2610/146; F01N 2900/1404; F01N 2900/1402; F01N 2560/06; F02D 41/0245; F02D 41/1446; F02D 2200/0802; Y02T 10/12; Y02T 10/40

See application file for complete search history.

(56) References Cited

U.S. PATENT DOCUMENTS

| | | | |
|---|---|---|---|
| 11,008,921 B1* | 5/2021 | Binetti | F01N 9/005 |
| 11,181,026 B1* | 11/2021 | Webb | F01N 3/206 |
| 2009/0035195 A1 | 2/2009 | Robel | |
| 2013/0067892 A1* | 3/2013 | Minezawa | F01N 9/00 60/276 |
| 2015/0204226 A1 | 7/2015 | Moore | |
| 2017/0342884 A1 | 11/2017 | Lee et al. | |
| 2018/0142590 A1* | 5/2018 | Gupta | F01N 11/00 |
| 2021/0033012 A1 | 2/2021 | Lundström et al. | |

FOREIGN PATENT DOCUMENTS

| | | |
|---|---|---|
| CN | 103912351 A | 7/2014 |
| CN | 104718356 A | 6/2015 |
| CN | 107035487 A | 8/2017 |
| CN | 109306894 A | 2/2019 |
| JP | 2009-133291 A | 6/2009 |
| WO | 2006/021748 A1 | 3/2006 |
| WO | 2016/108518 A1 | 7/2016 |

OTHER PUBLICATIONS

Office Action dated Apr. 11, 2023, for corresponding Chinese patent application No. 202210139737.6 (13 pages).

* cited by examiner

EXHAUST GAS AFTER-TREATMENT SYSTEM

CROSS-REFERENCE TO RELATED APPLICATIONS

This application claims benefit and priority to Korean Patent Application No. 10-2021-0020169, filed on Feb. 15, 2021 with the Korean Intellectual Property Office, the disclosure of which is incorporated herein in its entirety by reference.

TECHNICAL FIELD

The present disclosure relates to an exhaust gas after-treatment system, and more particularly, to an exhaust gas after-treatment system for performing an after-treatment on exhaust gas discharged from an engine.

BACKGROUND

In general, various power devices including diesel engines used for vehicles, ships, or plants produce exhaust gases. However, regulations on the exhaust gas discharged from the power device have become stricter globally. Therefore, the exhaust gas produced from the power device is discharged through an exhaust gas after-treatment system.

In particular, because the diesel engine combusts fuel by compression ignition, the diesel engine discharges the exhaust gas containing a large amount of nitrogen oxide (NOx). In addition, the diesel engine has lean-burn properties that improve fuel economy, but the diesel engine cannot use three-way catalyst unlike a gasoline engine. Therefore, to meet the stricter regulations on the exhaust gas, the diesel engine uses a selective catalytic reduction (SCR) system to reduce the amount of nitrogen oxide contained in the exhaust gas.

The selective catalytic reduction system is a method of reducing the amount of nitrogen oxide (NOx) by allowing a reducing agent to react with nitrogen oxide (NOx) in a reactor in which a catalyst is disposed. The selective catalytic reduction system injects an aqueous urea solution which is the reducing agent, into the exhaust gas, such that ammonia, which is produced as the injected aqueous urea solution is decomposed, reacts with nitrogen oxide, thereby reducing the amount of nitrogen oxide discharged together with the exhaust gas.

However, because the nature of the selective catalytic reduction system, the selective catalytic reduction system has high conversion efficiency at a particular temperature, and the efficiency of the selective catalytic reduction system significantly deteriorates when the selective catalytic reduction system operates at a low temperature. When a temperature of the exhaust gas is low, urea is not completely converted into ammonia, which causes deterioration in efficiency in reducing the amount of nitrogen oxide or creates deposits due to remaining urea or by-products. The temperature of the exhaust gas discharged from the engine often varies depending on various factors. For this reason, there is a problem in that the reducing agent injected into the exhaust gas cannot be completely decomposed in accordance with situations, which causes deterioration in efficiency in reducing the amount of nitrogen oxide or creates deposits.

SUMMARY

The present disclosure has been made in an effort to provide an exhaust gas after-treatment system capable of effectively improving efficiency in reducing the amount of nitrogen oxide while coping with a change in temperature of exhaust gas.

An exemplary embodiment of the present disclosure provides an exhaust gas after-treatment system including: an exhaust flow path configured to move exhaust gas discharged from an engine; a first reactor installed in the exhaust flow path and embedded with a catalyst for reducing the amount of nitrogen oxide contained in the exhaust gas; a second reactor installed in the exhaust flow path, disposed at a downstream side from the first reactor, and embedded with a catalyst for reducing the amount of nitrogen oxide contained in the exhaust gas; a first reducing agent injection unit configured to inject a reducing agent toward the exhaust gas to be introduced into the first reactor; a second reducing agent injection unit configured to inject the reducing agent toward the exhaust gas to be introduced into the second reactor; a reducing agent supply unit configured to supply the reducing agent to the first and second reducing agent injection units; a first temperature sensor configured to measure a temperature of the exhaust gas to be introduced into the first reactor; a second temperature sensor configured to measure a temperature of the exhaust gas to be introduced into the second reactor; and a control device configured to control whether to inject the reducing agent from the first and second reducing agent injection units and the amount of reducing agent to be injected on the basis of temperature information provided by the first and second temperature sensors.

The control device may inject the reducing agent from the first reducing agent injection unit while raising the temperature of the exhaust gas by controlling the engine when the temperature of the exhaust gas measured by the first temperature sensor is higher than a second reference temperature and the temperature of the exhaust gas measured by the second temperature sensor is equal to or lower than a third reference temperature. Further, the control device may inject the reducing agent from the first and second reducing agent injection units when the temperature of the exhaust gas measured by the first temperature sensor is higher than the second reference temperature and the temperature of the exhaust gas measured by the second temperature sensor is higher than the third reference temperature.

The control device may set a ratio of the amount of reducing agent to be injected to a concentration of nitrogen oxide so that the ratio in the first reducing agent injection unit is equal to or higher than the ratio in the second reducing agent injection unit when the temperature of the exhaust gas measured by the first temperature sensor is higher than the second reference temperature and the temperature of the exhaust gas measured by the second temperature sensor is higher than the third reference temperature. The control device may set the ratio of the amount of reducing agent to be injected to the concentration of nitrogen oxide so that the ratio in the second reducing agent injection unit is equal to or higher than the ratio in the first reducing agent injection unit when the temperature of the exhaust gas measured by the first temperature sensor is higher than the second reference temperature and the temperature of the exhaust gas measured by the second temperature sensor is higher than the fourth reference temperature.

The control device may raise the temperature of the exhaust gas by controlling the engine when the temperature of the exhaust gas measured by the first temperature sensor is equal to or lower than a first reference temperature, and the control device may maintain the reducing agent supply unit in a state ready to supply the reducing agent while raising the temperature of the exhaust gas by controlling the engine when the temperature of the exhaust gas measured by the first temperature sensor is higher than the first reference temperature and equal to or lower than the second reference temperature higher than the first reference temperature.

The control device may adjust the temperature of the exhaust gas to be discharged from the engine by controlling an operational condition of the engine.

The exhaust gas after-treatment system may further include a first nitrogen oxide concentration sensor configured to measure a concentration of nitrogen oxide of the exhaust gas to be introduced into the first reactor.

The control device may control the amount of reducing agent to be injected from the first reducing agent injection unit on the basis of a value measured by the first nitrogen oxide concentration sensor when the temperature of the exhaust gas measured by the first temperature sensor is higher than a second reference temperature.

A relatively larger amount of catalyst may be embedded in the second reactor than in the first reactor.

The reducing agent supply unit may include: a reducing agent tank configured to store the reducing agent; a reducing agent pump configured to supply the reducing agent, which is stored in the reducing agent tank, to the first and second reducing agent injection units; and a reducing agent supply pipe configured to connect the reducing agent pump to the first and second reducing agent injection units.

The reducing agent supply unit may fill the reducing agent supply pipe with the reducing agent and maintain a preset pressure in which one or both of the first and second reducing agent injection units is ready to supply the reducing agent before injecting the reducing agent.

The reducing agent remaining in the reducing agent supply pipe may be returned to the reducing agent tank when the reducing agent supply unit stops supplying the reducing agent.

One or both of a diesel oxidation catalyst (DOC) and a diesel particulate filter (DPF) may be disposed between the first reactor and the second reactor.

An ammonia oxidation catalyst may be disposed at a rear end of the second reactor.

According to the embodiment of the present disclosure, the exhaust gas after-treatment system may improve the efficiency in effectively reducing the amount of nitrogen oxide while coping with the change in temperature of the exhaust gas.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Hereinafter, embodiments of the present disclosure will be described in detail with reference to the accompanying drawings so that those with ordinary skill in the art to which the present disclosure pertains may easily carry out the embodiments. The present disclosure may be implemented in various different ways, and is not limited to the embodiments described herein.

It is noted that the drawings are schematic, and are not illustrated based on actual scales. Relative dimensions and proportions of parts illustrated in the drawings are exaggerated or reduced in size for the purpose of clarity and convenience in the drawings, and any dimension is just illustrative but not restrictive. The same reference numerals designate the same structures, elements or components illustrated in two or more drawings in order to exhibit similar characteristics.

Embodiments of the present disclosure illustrate ideal embodiments of the present disclosure in detail. As a result, various modifications of the drawings are expected. Therefore, the embodiments are not limited to specific forms in regions illustrated in the drawings, and for example, include modifications of forms by the manufacture thereof.

Hereinafter, an exhaust gas after-treatment system 101 according to an embodiment of the present disclosure will be described with reference to FIG. 1.

The exhaust gas after-treatment system according to the embodiment of the present disclosure may purify exhaust gas discharged from an engine 100, and particularly, reduce the amount of nitrogen oxide (NOx) contained in the exhaust gas. In this case, the engine 100 may be a diesel engine.

Although not illustrated, a part or the entirety of the exhaust gas discharged from the engine 100 may pass through a supercharger. The supercharger is connected to an exhaust port of the engine 100 and rotates a turbine by using a pressure of the exhaust gas discharged from the engine 100, thereby compressing new outside air and supplying the compressed air to the engine 100. Therefore, the engine 200 equipped with the supercharger has improved efficiency.

The exhaust gas discharged from the engine 100 may have a temperature within a range of 150 degrees Celsius to 600 degrees Celsius. The temperature of the exhaust gas may be further lowered after the exhaust gas passes through the supercharger. In particular, the temperature of the exhaust gas may be further lowered when the engine 100 initially operates.

Figure 1:
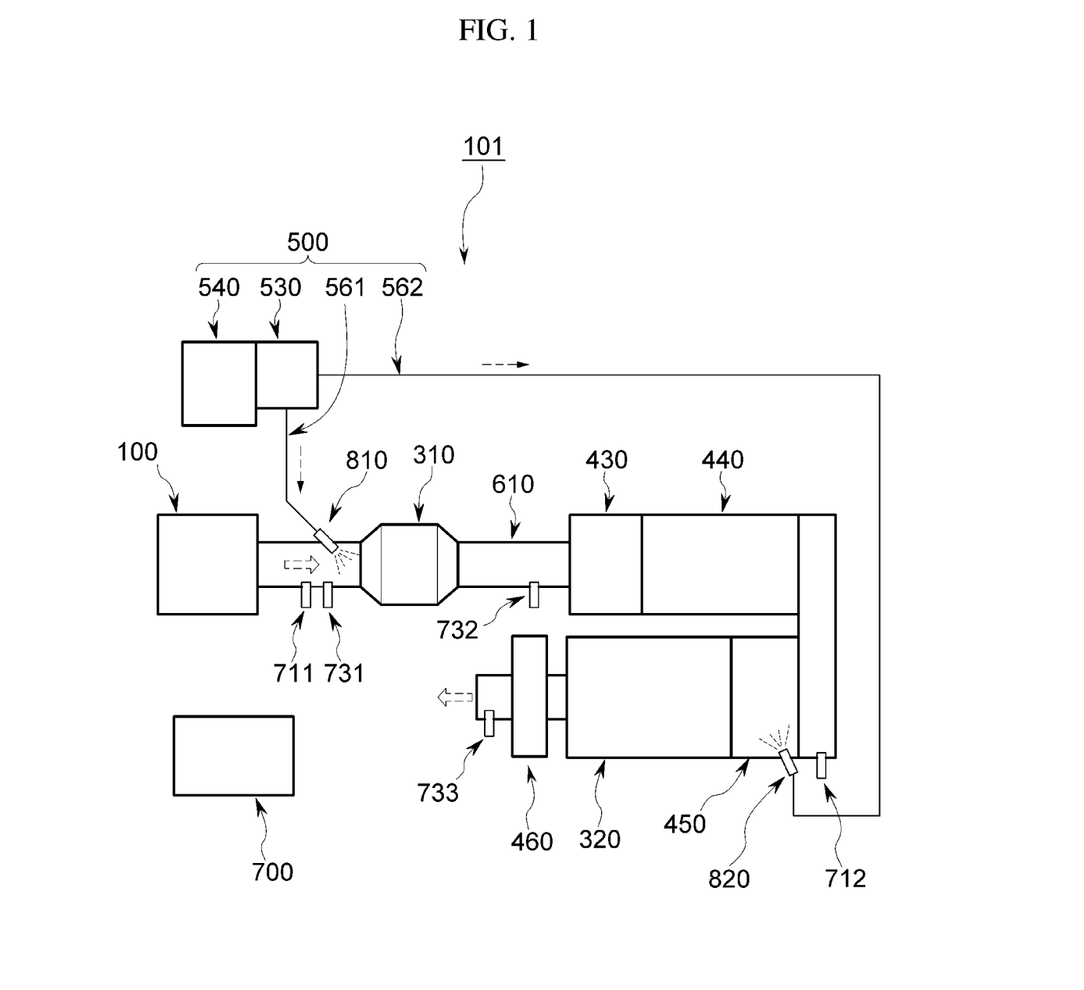
FIG. 1 is a configuration view of an exhaust gas after-treatment system according to an embodiment of the present disclosure.

As illustrated in FIG. 1, the exhaust gas after-treatment system 101 according to the embodiment of the present disclosure includes an exhaust flow path 610, a first reactor 310, a second reactor 320, a first reducing agent injection unit 810, a second reducing agent injection unit 820, a reducing agent supply unit 500, a first temperature sensor 711, a second temperature sensor 712, and a control device 700.

In addition, the exhaust gas after-treatment system 101 according to the embodiment of the present disclosure may further include a first nitrogen oxide concentration sensor 731, a second nitrogen oxide concentration sensor 732, a third nitrogen oxide concentration sensor 733, a diesel oxidation catalyst (DOC) 430, a diesel particulate filter (DPF) 440, a mixer 450, and an ammonia oxidation catalyst 460.

The exhaust flow path 610 moves the exhaust gas discharged from the engine 100 and containing nitrogen oxide (NOx). Further, the exhaust flow path 610 is connected to the first and second reactors 310 and 320 to be described below.

The first reactor 310 is disposed in the exhaust flow path 610, and the second reactor 320 is disposed in the exhaust flow path 610 and disposed at a downstream side from the first reactor 310.

Hereinafter, in the present specification, the upstream and downstream sides are defined on the basis of the movement direction of the exhaust gas.

The first and second reactors 310 and 320 are each embedded with a catalyst for reducing the amount of nitrogen oxide (NOx) contained in the exhaust gas. For example, a relatively larger amount of catalyst is embedded in the second reactor 320 than the first reactor 310, and the second reactor 320 may have relatively higher performance in reducing the amount of nitrogen oxide. That is, the second reactor 320 may serve as a main reactor, and the first reactor 310 may assist the second reactor 320.

The catalyst facilitates the reaction between the reducing agent and the nitrogen oxide (NOx) contained in the exhaust gas and reduces nitrogen oxide (NOx) into nitrogen and moisture vapor. For example, the catalyst may be made of various materials, such as zeolite, vanadium, and platinum, publicly-known to those skilled in the art. The catalyst may have an activation temperature within a range of 200 degrees Celsius to 500 degrees Celsius. In this case, the activation temperature refers to a temperature at which the catalyst may stably reduce nitrogen oxide without being poisoned. If the catalyst reacts out of the activation temperature range, the catalyst is poisoned, which causes deterioration in efficiency. If the reduction reaction for reducing the amount of nitrogen oxide contained in the exhaust gas occurs at a relatively low temperature equal to or higher than 150 degrees Celsius and lower than 200 degrees Celsius, ammonia ($NH_3$) and sulfur oxide (SOx) in the exhaust gas react with each other, which produces catalyst poisoning substances. Specifically, the substances, which poison the catalyst, may include one or both of ammonium sulfate (($NH_4)_2SO_4$) and ammonium bisulfate ($NH_4HSO_4$). The catalyst poisoning substance is adsorbed to the catalyst and degrades activity of the catalyst. Because the catalyst poisoning substance is decomposed at a relatively high temperature, i.e., a temperature within a range of 350 degrees Celsius to 450 degrees Celsius, the poisoned catalyst may be regenerated by raising temperatures of the catalysts embedded in the first and second reactors 310 and 320.

The first reducing agent injection unit 810 injects the reducing agent toward the exhaust gas to be introduced into the first reactor 310. For example, the first reducing agent injection unit 810 may be provided in the exhaust flow path 610 and disposed at an upstream side from the first reactor 310.

The second reducing agent injection unit 820 injects the reducing agent toward the exhaust gas to be introduced into the second reactor 320. For example, the second reducing agent injection unit 820 may disposed at an upstream side from the second reactor 320.

The reducing agent supply unit 500 supplies the reducing agent to the first reducing agent injection unit 810 and the second reducing agent injection unit 820. The reducing agent supplied by the reducing agent supply unit 500 may be an aqueous urea ($CO(NH_2)_2$) solution. The aqueous urea solution serves as a precursor of the reducing agent that reacts with nitrogen oxide. The substance, which reacts directly with nitrogen oxide (NOx), is ammonia ($NH_3$). However, because it is difficult to store and transport ammonia because ammonia is the contaminant, the stable aqueous urea solution is supplied and decomposed to create ammonia gas. Specifically, as urea is thermal decomposed or hydrolyzed, ammonia ($NH_3$) and isocyanic acid (HNCO) are created, and isocyanic acid (HNCO) may be decomposed into ammonia ($NH_3$) and carbon dioxide ($CO_2$). In this case, a temperature range in which urea may be decomposed may be within a range of 250 degrees Celsius to 600 degrees Celsius. Further, the finally created ammonia ($NH_3$) reacts with nitrogen oxide (NOx) contained in the exhaust gas.

Specifically, the reducing agent supply unit 500 may include a reducing agent tank 540 configured to store the reducing agent, a reducing agent pump 530 configured to supply the reducing agent, which is stored in the reducing agent tank 540, to the first and second reducing agent injection units 810 and 820, and reducing agent supply pipes 561 and 562 configured to connect the reducing agent pump 530 to the first and second reducing agent injection units 810 and 820.

The reducing agent supply pipes 561 and 562 may include a first reducing agent supply pipe 561 configured to connect the reducing agent pump 530 and the first reducing agent injection unit 810, and a second reducing agent supply pipe 562 configured to connect the reducing agent pump 530 and the second reducing agent injection unit 820.

Although not illustrated, control valves may be respectively installed in the first and second reducing agent supply pipes 561 and 562. The control valve operates under the control of the control device 700 to be described below and enables the reducing agent supply unit 500 to supply the reducing agent selectively to one or both of the first and second reducing agent injection units 810 and 820. In this case, the control valve may control not only whether to inject the reducing agent, but also the amount of reducing agent to be injected.

However, the embodiment of the present disclosure is not limited thereto. That is, no separate control valve may be provided, and the first and second reducing agent injection units 810 and 820 may autonomously adjust whether to inject the reducing agent and the amount of reducing agent to be injected under the control of the control device 700.

The first temperature sensor 711 measures a temperature of the exhaust gas to be introduced into the first reactor 310. For example, the first temperature sensor 711 may be provided in the exhaust flow path 610 and disposed at an upstream side from the first reactor 310.

The second temperature sensor 712 measures a temperature of the exhaust gas to be introduced into the second reactor 320. For example, the second temperature sensor 712 may be disposed at an upstream side from the second reactor 320.

The first nitrogen oxide concentration sensor 731 measures a concentration of nitrogen oxide in the exhaust gas to be introduced into the first reactor 310. In this case, the first nitrogen oxide concentration sensor 731 may be provided in the exhaust flow path 610 and disposed at an upstream side from the first reducing agent injection unit 810. If the first nitrogen oxide concentration sensor 731 is disposed at a downstream side from the first reducing agent injection unit 810, the accuracy of the first nitrogen oxide concentration sensor 731 may deteriorate because of the reducing agent injected from the first reducing agent injection unit 810.

The second nitrogen oxide concentration sensor 732 measures a concentration of nitrogen oxide in the exhaust gas to be introduced into the second reactor 320. In this case, the second nitrogen oxide concentration sensor 732 may be disposed at an upstream side from the second reducing agent injection unit 820. If the second nitrogen oxide concentration sensor 732 is positioned at a downstream side from the second reducing agent injection unit 820, the accuracy of the second nitrogen oxide concentration sensor 732 may deteriorate because of the reducing agent injected from the second reducing agent injection unit 820.

The third nitrogen oxide concentration sensor 733 measures a concentration of nitrogen oxide in the exhaust gas discharged from the second reactor 320. In this case, the third nitrogen oxide concentration sensor 733 may be disposed at a downstream side from the second reducing agent injection unit 820. The third nitrogen oxide concentration sensor 733 may measure a concentration of nitrogen oxide contained in the final exhaust gas having passed through the exhaust gas after-treatment system.

On the basis of the temperature information provided by the first and second temperature sensors 711 and 712, the control device 700 may control whether to inject the reducing agent from the first and second reducing agent injection units 810 and 820 and the amount of reducing agent to be injected. In this case, based on information on concentrations of nitrogen oxide provided by the first nitrogen oxide concentration sensor 731, the second nitrogen oxide concentration sensor 732, and the third nitrogen oxide concentration sensor 733, the control device 700 may adjust the amount of reducing agent to be injected from the first and second reducing agent injection units 810 and 820.

That is, on the basis of the temperature of the exhaust gas, the control device 700 enables only the first reducing agent injection unit 810 to inject the reducing agent or enables both the first and second reducing agent injection units 810 and 820 to inject the reducing agent. The control device 700 may control the amount of reducing agent to be injected or a ratio of the amount of reducing agent to be injected to the concentration of nitrogen oxide differently on the basis of the temperature of the exhaust gas when the first and second reducing agent injection units 810 and 820 inject the reducing agent.

The control device 700 may adjust the temperature of the exhaust gas to be discharged from the engine 100 by controlling operational conditions of the engine 100.

The diesel oxidation catalyst (DOC) 430 may be disposed between the first reactor 310 and the second reactor 320.

The diesel oxidation catalyst 430 serves to primarily oxidize nitrogen monoxide (NO) to nitrogen dioxide ($NO_2$). An increase in proportion of nitrogen dioxide ($NO_2$) in nitrogen oxide (NOx) contained in the exhaust gas is important in efficiently reducing the amount of nitrogen oxide (NOx) by means of a selective catalyst reduction reaction.

The diesel oxidation catalyst 430 may reduce the amount of carbon monoxide (CO) and the amount of hydrocarbon (HC) and reduce the number of particulates contained in the exhaust gas by combusting hydrocarbon (HC) contained in the exhaust gas. Therefore, the diesel oxidation catalyst 430 may reduce the number of particulate matters captured by the diesel particulate filter 440 to be described below by combusting hydrocarbon (HC), thereby increasing a cycle for regenerating the diesel particulate filter 440.

The diesel particulate filter (DPF) 440 may be installed between the diesel oxidation catalyst 430 and the second reactor 320. The diesel particulate filter 440 filters out, captures, and removes the particulate matters such as soot contained in the exhaust gas of the engine 100.

The mixer 450 may be installed between the diesel particulate filter 440 and the second reactor 320. In addition, at least a part of the mixer 450 may be disposed at a downstream side from the second reducing agent injection unit 820. The mixer 450 may effectively mix the exhaust gas and the reducing agent injected from the second reducing agent injection unit 820.

Meanwhile, in the embodiment of the present disclosure, the diesel oxidation catalyst 430, the diesel particulate filter 440, the mixer 450, and the second reactor 320 may be configured as a single module. In this case, the module may have a "U" shape to improve spatial utilization.

With this configuration, the exhaust gas after-treatment system 101 according to the embodiment of the present disclosure may effectively improve efficiency in reducing the amount of nitrogen oxide while coping with the change in temperature of the exhaust gas.

Specifically, it is possible to reduce the amount of nitrogen oxide by quickly raising the temperature of the first reactor 310 when the temperature of the exhaust gas is low. The first reactor 310 is relatively closer to the engine 100 than is the second reactor 320, and the exhaust gas needs to pass through the diesel oxidation catalyst 430 and the diesel particulate filter 440 to reach the second reactor 320. For this reason, the temperature of the exhaust gas to be introduced into the second reactor 320 is inevitably and relatively lower than the temperature of the exhaust gas to be introduced into the first reactor 310. In addition, when the temperature of the exhaust gas is forcibly raised by controlling the operational condition of the engine 100, the temperature of the first reactor 310 relatively closer to the engine 100 may be relatively quickly raised.

Therefore, in the state in which the temperature of the exhaust gas is low, the temperature of the first reactor 310 may be quickly raised, such that the amount of nitrogen oxide may be reduced by the reducing agent injected by the first reducing agent injection unit 810. That is, in the embodiment of the present disclosure, the first reactor 310 may be used to smartly cope with the change in temperature of the exhaust gas discharged from the engine 100.

When the temperature of the exhaust gas is sufficiently raised and the second reactor 320 is operated, the first reactor 310 may assist the second reactor 320, thereby improving overall efficiency in reducing the amount of nitrogen oxide.

Figure 2:
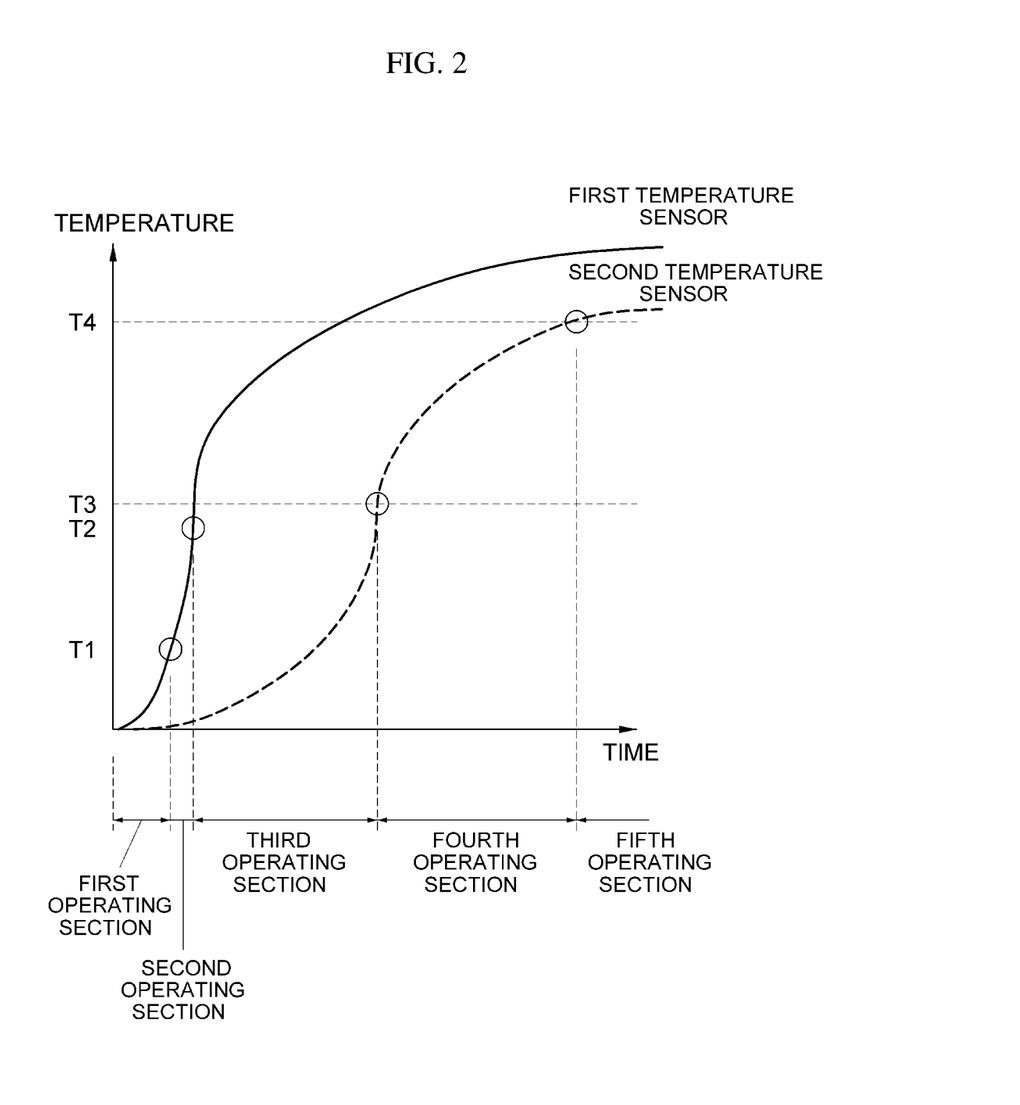
FIG. 2 is a graph illustrating temperatures which are criteria for which the exhaust gas after-treatment system illustrated in FIG. 1 switches operations.
Figure 3:
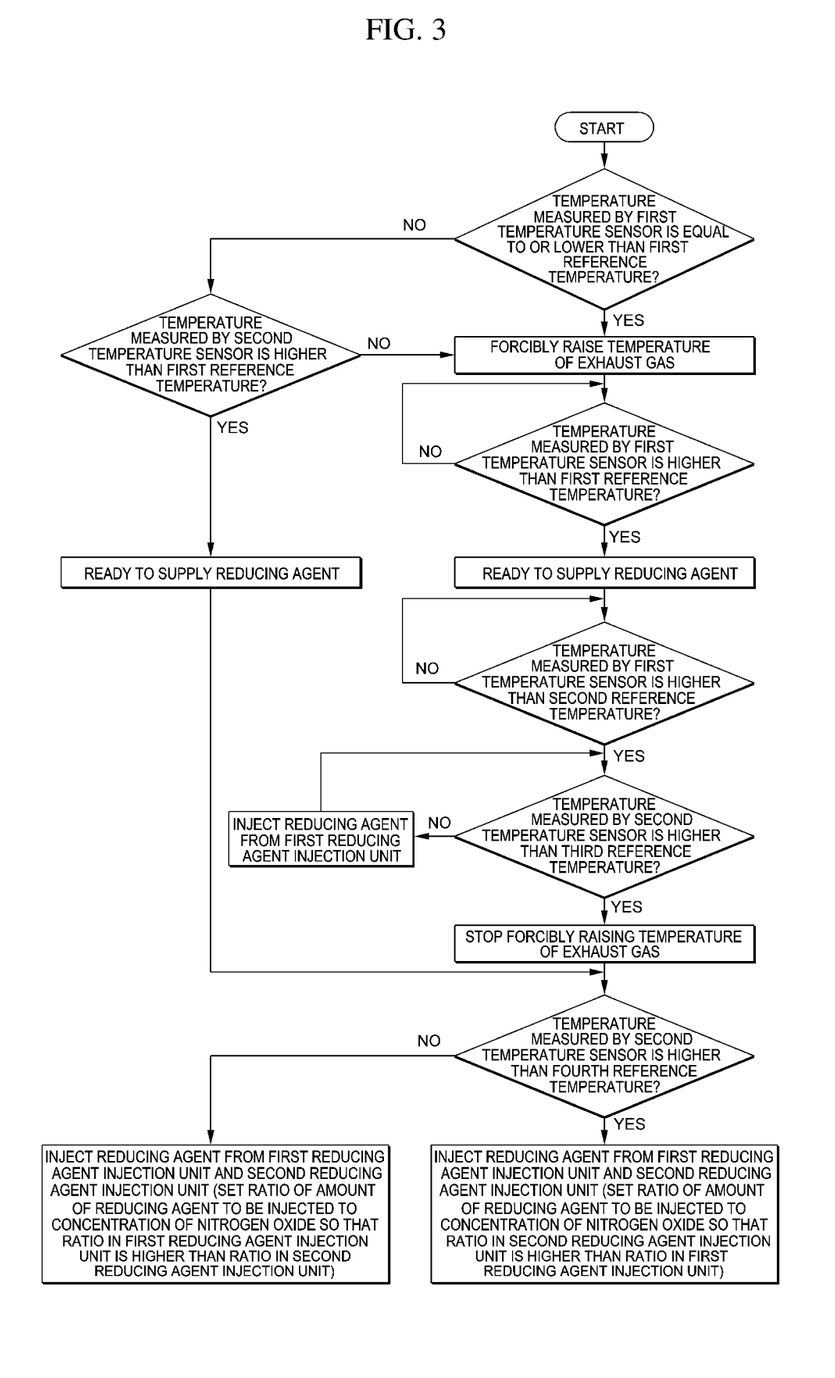
FIG. 3 is a flowchart illustrating a process of operating the exhaust gas after-treatment system according to the embodiment of the present disclosure.

Hereinafter, an operational principle of the exhaust gas after-treatment system 101 according to the embodiment of the present disclosure will be described with reference to the following Table 1 and FIGS. 2 and 3. In Table 1, ANR means ammonia NOx ratio.

TABLE 1

| Operational Condition | Temperature TS1 Measured by First Temperature Sensor | Temperature TS2 Measured by Second Temperature Sensor | Forcible Raise Temperature of Exhaust Gas | Ready to Supply Reducing Agent | First Reducing Agent Injection Unit | Second Reducing Agent Injection Unit |
|---|---|---|---|---|---|---|
| First Operational Condition | TS1 ≤ T1 | | On | Off | Off | Off |
| Second Operational Condition | T1 < TS1 ≤ T2 | | On | On | Off | Off |
| Third Operational Condition | T2 < TS1 | TS4 ≤ T3 | On | On | On (ANR = a) | Off |
| Fourth Operational Condition | T2 < TS1 | T3 < TS4 ≤ T4 | Off | On | On (ANR = b) | On (ANR = c) |
| Fifth Operational Condition | T2 < TS1 | T4 < TS4 | Off | On | On (ANR = d) | On (ANR = e) |

In Table 1, T1 represents a first reference temperature, T2 represents a second reference temperature, T3 represents a third reference temperature, and T4 represents a fourth reference temperature. As an example, the first reference temperature T1, the second reference temperature T2, the third reference temperature T3, and the fourth reference temperature T4 may be set as illustrated in FIG. 2. That is, the second reference temperature T2 may be set to be higher than the first reference temperature T1, the third reference temperature T3 may be set to be higher than the second reference temperature T2, and the fourth reference temperature T4 may be set to be higher than the third reference temperature T3. In addition, the first reference temperature T1, the second reference temperature T2, the third reference temperature T3, and the fourth reference temperature T4 may be variously set in accordance with the type of the engine 100, the component of the reducing agent, and the performance of the catalysts embedded in the first and second reactors 310 and 320.

In Table 1, ANR (ammonia NOx ratio) represents a ratio of the amount of reducing agent to be injected to the concentration of nitrogen oxide, and the amount of reducing agent to be injected is controlled on the basis of the ANR. In the third operational condition, a may be determined on the basis of the concentration of nitrogen oxide measured by the first nitrogen oxide concentration sensor 731. In addition, b and c in the fourth operational condition and d and e in the fifth operational condition may also be determined on the basis of the concentration of nitrogen oxide measured by the first nitrogen oxide concentration sensor 731. In the fourth operational condition, b may be equal to or larger than c. In the fifth operational condition, d may be equal to or smaller than e. However, in some instances, a, b, c, d, and e may be determined on the basis of the concentration of nitrogen oxide measured by the second nitrogen oxide concentration sensor 732 or the third nitrogen oxide concentration sensor 733, but the present disclosure is not limited thereto.

The operational principle of the exhaust gas after-treatment system 101 will be described with reference to the above-mentioned Table 1 and FIG. 3. First, the first temperature sensor 711 measures the temperature of the exhaust gas.

In the first operational condition in which the temperature of the exhaust gas measured by the first temperature sensor 711 is equal to or lower than the first reference temperature T1, the control device 700 may raise the temperature of the exhaust gas by controlling the engine 100. In this case, the control device 700 may adjust the temperature of the exhaust gas to be discharged from the engine 100 by controlling the operational conditions of the engine 100. For example, the control device 700 may forcibly raise the temperature of the exhaust gas by adjusting throttling or fuel injection timing of the engine 100. However, the embodiment of the present disclosure is not limited thereto, and the control device 700 may forcibly raise the temperature of the exhaust gas by using various methods including a method of increasing a rotational speed or a load of the engine 100.

If the temperature of the exhaust gas is sufficiently high enough to inject the reducing agent from the first and second reducing agent injection units 810 and 820, the control device 700 need not forcibly raise the temperature of the exhaust gas to be discharged from the engine 100 by controlling the operational conditions of the engine 100. In this case, the control device 700 may perform control to inject the reducing agent from the first and second reducing agent injection units 810 and 820 without forcibly raising the temperature of the exhaust gas in accordance with the fourth operational condition or the fifth operational condition to be described below.

In the second operational condition in which the temperature of the exhaust gas measured by the first temperature sensor 711 is higher than the first reference temperature T1 and equal to or lower than the second reference temperature T2 higher than the first reference temperature T1 after the temperature of the exhaust gas is forcibly raised, the control device 700 maintains the reducing agent supply unit 500 in a state ready to supply the reducing agent while raising the temperature of the exhaust gas by controlling the engine 100.

The state ready to supply the reducing agent means a state in which one or both of the first and second reducing agent injection units 810 and 820 are ready to immediately inject the reducing agent before injecting the reducing agent. For example, in the state ready to supply the reducing agent, the reducing agent supply pipes 561 and 562 may be filled with the reducing agent and maintained at a preset pressure.

Next, in the third operational condition in which the temperature of the exhaust gas measured by the first temperature sensor 711 is higher than the second reference temperature T2 and the temperature of the exhaust gas measured by the second temperature sensor 712 is equal to or lower than the third reference temperature T3, the control device 700 injects the reducing agent from the first reducing agent injection unit 810 while raising the temperature of the exhaust gas by controlling the engine 100. In this case, the control device 700 controls the amount of reducing agent to be injected from the first reducing agent injection unit 810 on the basis of the value measured by the first nitrogen oxide concentration sensor 731. That is, the control device 700 may perform control to inject an appropriate amount of reducing agent that may reduce the concentration of the nitrogen oxide measured by the first nitrogen oxide concentration sensor 731 to a target value in consideration of the component of the reducing agent.

Next, in the fourth operational condition in which the temperature of the exhaust gas measured by the first temperature sensor 711 is higher than the second reference temperature T2 and the temperature of the exhaust gas measured by the second temperature sensor 712 is higher than the third reference temperature T3 and equal to or lower than the fourth reference temperature T4 higher than the third reference temperature T3, the control device 700 injects the reducing agent from the first and second reducing agent injection units 810 and 820.

In this case, the control device 700 may set the ratio of the amount of reducing agent to be injected to the concentration of nitrogen oxide so that the ratio in the first reducing agent injection unit 810 is equal to or higher than the ratio in the second reducing agent injection unit 820. This is because the temperature of the first reactor 310 is higher and reduction reactivity is excellent in the fourth operational condition and because the entire reducing agent cannot react with the nitrogen oxide and an ammonia slip may occur because of low reduction reactivity in the second reactor 320.

Therefore, it is possible to inhibit the occurrence of ammonia slip in the second reactor 320 by decreasing the ratio of the amount of reducing agent to be injected by the second reducing agent injection unit 820 to the concentration of the nitrogen oxide.

To more stably prevent the ammonia slip, an ammonia oxidation catalyst (AOC) 460 may be provided at a rear end of the second reactor 320.

Next, in the fifth operational condition in which the temperature of the exhaust gas measured by the first temperature sensor 711 is higher than the second reference temperature T2 and the temperature of the exhaust gas measured by the second temperature sensor 712 is higher than the fourth reference temperature T4, the control device 700 may set the ratio of the amount of reducing agent to be injected to the concentration of nitrogen oxide so that the ratio in the second reducing agent injection unit 820 is equal to or higher than the ratio in the first reducing agent injection unit 810. That is, in the fifth operational condition, the second reactor 320 is mainly used to reduce the amount of nitrogen oxide, and the first reactor 310 assists the second reactor 320, thereby improving overall efficiency in reducing the amount of nitrogen oxide. When the temperature of the exhaust gas is lowered again, the amount of reducing agent to be injected from the first and second reducing agent injection units 810 and 820 may be adjusted to smartly cope with the low temperature of the exhaust gas.

Thereafter, when the reducing agent supply unit 500 stops supplying the reducing agent, the reducing agent remaining in the reducing agent supply pipes 561 and 562 may be returned to the reducing agent tank 540. If the reducing agent remains in the reducing agent supply pipes 561 and 562 over a long period of time, deposits may be created, and the reducing agent may be frozen at a very low temperature. In that case, the reducing agent supply pipes 561 and 562 may be clogged or the first and second reducing agent injection units 810 and 820 may malfunction and break down.

According to the operational principle described above, the exhaust gas after-treatment system 101 according to the embodiment of the present disclosure may effectively improve efficiency in reducing the amount of nitrogen oxide while coping with the change in temperature of the exhaust gas.

In particular, in the case in which the temperature of the exhaust gas is low, the temperature of the first reactor 310 may be quickly raised, such that the amount of nitrogen oxide may be reduced by the reducing agent injected by the first reducing agent injection unit 810. That is, the first reactor 310 may be used to smartly cope with the change in temperature of the exhaust gas discharged from the engine 100.

When the temperature of the exhaust gas is sufficiently raised and the second reactor 320 is operated, the first reactor 310 may assist the second reactor 320, thereby improving overall efficiency in reducing the amount of nitrogen oxide.

While the embodiments of the present disclosure have been described with reference to the accompanying drawings, those skilled in the art will understand that the present disclosure may be carried out in any other specific form without changing the technical spirit or an essential feature thereof.

Accordingly, it should be understood that the aforementioned embodiments are described for illustration in all aspects and are not limited, and the scope of the present disclosure shall be represented by the claims to be described below, and it should be construed that all of the changes or modified forms induced from the meaning and the scope of the claims, and an equivalent concept thereto are included in the scope of the present disclosure.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:
1. An exhaust gas after-treatment system comprising:
an exhaust flow path configured to move exhaust gas discharged from an engine;
a first reactor installed in the exhaust flow path and embedded with a catalyst for reducing the amount of nitrogen oxide contained in the exhaust gas;
a second reactor installed in the exhaust flow path, disposed at a downstream side from the first reactor, and embedded with a catalyst for reducing the amount of nitrogen oxide contained in the exhaust gas;
a first reducing agent injection unit configured to inject a reducing agent toward the exhaust gas to be introduced into the first reactor;
a second reducing agent injection unit configured to inject the reducing agent toward the exhaust gas to be introduced into the second reactor;
a reducing agent supply unit configured to supply the reducing agent to the first and second reducing agent injection units;

a first temperature sensor configured to measure a temperature of the exhaust gas to be introduced into the first reactor;
a second temperature sensor configured to measure a temperature of the exhaust gas to be introduced into the second reactor; and
a control device configured to control whether to inject the reducing agent from the first and second reducing agent injection units and the amount of reducing agent to be injected on the basis of temperature information provided by the first and second temperature sensors,
wherein the control device adjusts the temperature of the exhaust gas to be discharged from the engine by controlling an operational condition of the engine,
wherein the control device raises the temperature of the exhaust gas by controlling the engine when the temperature of the exhaust gas measured by the first temperature sensor is lower than a first reference temperature,
wherein
the control device injects the reducing agent from the first reducing agent injection unit while raising the temperature of the exhaust gas by controlling the engine when the temperature of the exhaust gas measured by the first temperature sensor is higher than a second reference temperature according to the performance of the catalyst contained in the first reactor and the second reactor and the temperature of the exhaust gas measured by the second temperature sensor is lower than a third reference temperature set higher than the second reference temperature, and
the control device injects the reducing agent from the first and second reducing agent injection units when the temperature of the exhaust gas measured by the first temperature sensor is higher than the second reference temperature and the temperature of the exhaust gas measured by the second temperature sensor is higher than the third reference temperature, and
wherein
the first reference temperature is preset in a range of higher than 150° C. and lower than 200° C.,
the second reference temperature is preset higher than the first reference temperature in a range of 200° C. to 500° C., and
the third reference temperature is preset higher than the second reference temperature in a range of 250° C. to 600° C.

2. The exhaust gas after-treatment system of claim 1, further comprising:
a first nitrogen oxide concentration sensor configured to measure a concentration of nitrogen oxide of the exhaust gas to be introduced into the first reactor.

3. The exhaust gas after-treatment system of claim 2, wherein the control device controls the amount of reducing agent to be injected from the first reducing agent injection unit on the basis of a value measured by the first nitrogen oxide concentration sensor when the temperature of the exhaust gas measured by the first temperature sensor is higher than a second reference temperature.

4. The exhaust gas after-treatment system of claim 1, wherein a relatively larger amount of catalyst is embedded in the second reactor than in the first reactor.

5. The exhaust gas after-treatment system of claim 1, wherein the reducing agent supply unit comprises:
a reducing agent tank configured to store the reducing agent;
a reducing agent pump configured to supply the reducing agent, which is stored in the reducing agent tank, to the first and second reducing agent injection units; and
a reducing agent supply pipe configured to connect the reducing agent pump to the first and second reducing agent injection units.

6. The exhaust gas after-treatment system of claim 5, wherein the reducing agent supply unit fills the reducing agent supply pipe with the reducing agent and maintains a preset pressure in which one or both of the first and second reducing agent injection units is ready to supply the reducing agent before injecting the reducing agent.

7. The exhaust gas after-treatment system of claim 5, wherein the reducing agent remaining in the reducing agent supply pipe is returned to the reducing agent tank when the reducing agent supply unit stops supplying the reducing agent.

8. The exhaust gas after-treatment system of claim 1, wherein one or both of a diesel oxidation catalyst (DOC) and a diesel particulate filter (DPF) are disposed between the first reactor and the second reactor.

9. The exhaust gas after-treatment system of claim 1, wherein an ammonia oxidation catalyst is disposed at a rear end of the second reactor.

* * * * *